F. SMOLAR.
PEDESTAL CAR SEAT.
APPLICATION FILED SEPT. 29, 1919.
1,346,386.
Patented July 13, 1920.
3 SHEETS—SHEET 1.
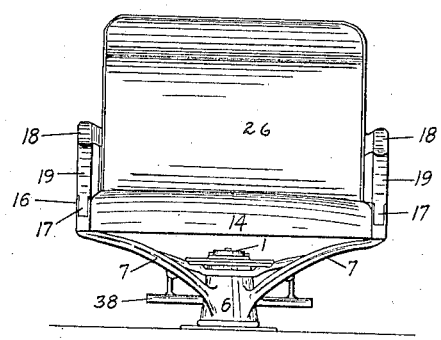
Fig. 1
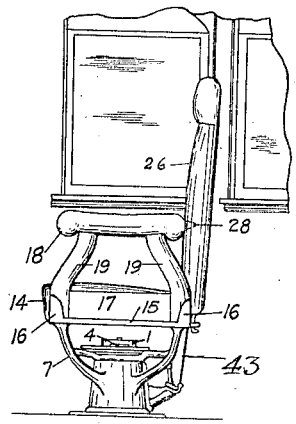
Fig. 2
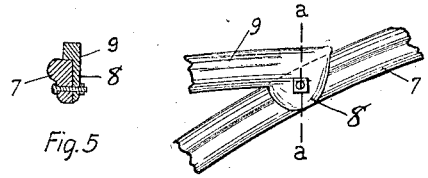
Fig. 5
Fig. 4
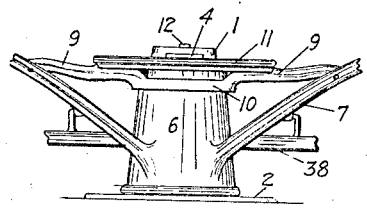
Fig. 3
WITNESSES:
INVENTOR.
Frank Smolar,
BY
His ATTORNEY.

F. SMOLAR.
PEDESTAL CAR SEAT.
APPLICATION FILED SEPT. 29, 1919.
1,346,386. Patented July 13, 1920.
3 SHEETS—SHEET 2.
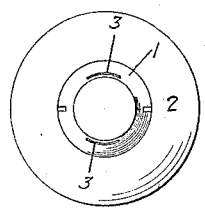
Fig. 10
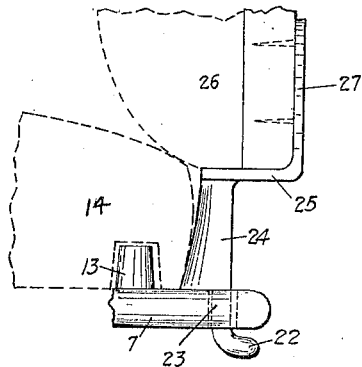
Fig. 11
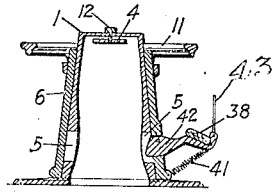
Fig. 9
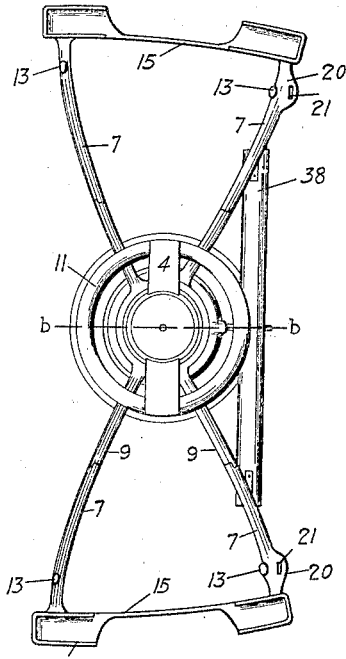
Fig. 6
Fig. 8
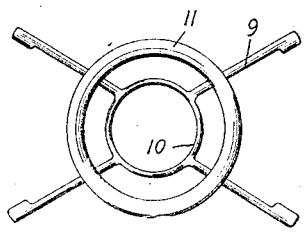
Fig. 7
WITNESSES:
INVENTOR.
Frank Smolar,
BY
His ATTORNEY

F. SMOLAR.
PEDESTAL CAR SEAT.
APPLICATION FILED SEPT. 29, 1919.

1,346,386.

Patented July 13, 1920.

3 SHEETS—SHEET 3.

WITNESSES:
Homer L. Rogers

INVENTOR.
Frank Smolar,
BY
Howard S. Smith,
ATTORNEY

UNITED STATES PATENT OFFICE.

FRANK SMOLAR, OF DAYTON, OHIO.

PEDESTAL CAR-SEAT.

1,346,386.　　　　　Specification of Letters Patent.　　Patented July 13, 1920.

Application filed September 29, 1919. Serial No. 327,040.

*To all whom it may concern:*

Be it known that I, FRANK SMOLAR, a citizen of the United States, residing at Dayton, in the county of Montgomery and State of Ohio, have invented certain new and useful Improvements in Pedestal Car-Seats, of which the following is a specification.

One of the principal objects of my invention is to provide a car seat whose back is not normally inclined, with the result that space between the seats is conserved. Accordingly, more seats may be placed in the car than in the case of the turn-over seats.

Another object of the invention is to provide a car seat which it is not necessary to secure to the wainscoting and in connection with which it is not necessary to use the window sill as an arm rest.

It is still another object of the invention to provide a pedestal seat which may be easily and quickly assembled and dismembered without the use of tools. The seat is also designed to provide space for a greater height of steam pipes, and ample room for suit cases and traveling bags under the seat bottom.

Another object of the invention is to provide a pedestal seat in which the back may be inclined by the occupant against spring pressure that serves to return the back to its normal upright position at the pleasure of the occupant, or after he has left it. The back of the seat cannot be kicked over as in the case of the "pull-over" type when passengers often attempt to turn the latter by kicking them with their feet. The cushion and back may be easily removed for cleaning and other purposes.

My improved seat is designed to be cheaply constructed, it can be turned around easily, and is provided with a back whose angle of inclination can be readily adjusted. It is adapted to be automatically locked in either of its extreme positions, and necessitates but one foot rest.

Figure 12:
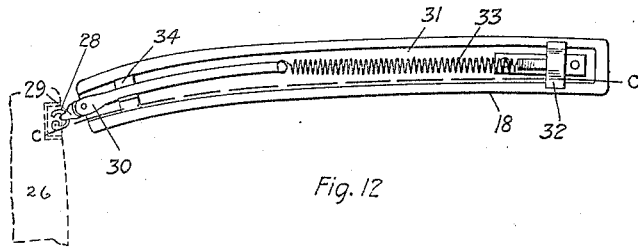
Figure 13:
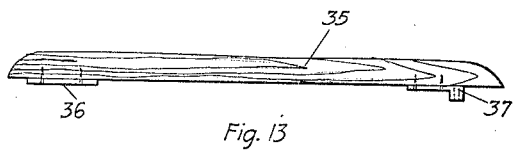
Figure 14:
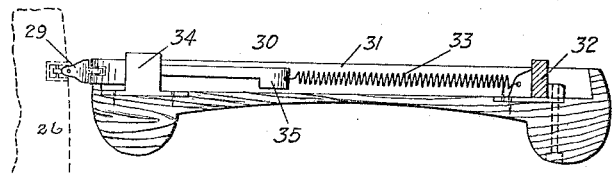
Figure 16:
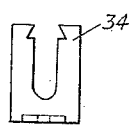
Figure 15:
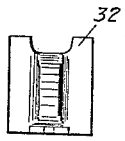

The preferred form of embodiment of my invention is illustrated in the accompanying drawings, of which Figure 1 is a front view of my pedestal car seat. Fig. 2 is a side view of the same. Fig. 3 is a side view of the pedestal, showing the seat-supporting framework attached thereto. Fig. 4 is a side view of the connection between a seat-supporting and a bracing arm. Fig. 5 is a section taken on the line *a—a* of Fig. 4. Fig. 6 is a top plan view of the seat framework. Fig. 7 is a top plan view of the retaining ring supported by the bracing arms. Fig. 8 is a view looking toward the hinged foot-rest. Fig. 9 is a vertical section taken on the line *b—b* of Fig. 6, showing the means for locking the seat-supporting sleeve to the pedestal. Fig. 10 is a view looking down upon the pedestal and sleeve. Fig. 11 is a side view showing the means for hingedly securing the seat-back to the supporting arms. Fig. 12 is a top plan view of the recessed portion of a seat arm with the top part of the latter removed. Fig. 13 is a side view of said top part, or cover, for the recessed portion of the seat arm. Fig. 14 is a section taken on the line *c—c* of Fig. 12, showing the resilient back-restraining means within the recessed portion of a seat arm. Fig. 15 is a detail view of the anchor for the spring, within said recessed portion. And Fig. 16 is a detail view of the guide for the slide within said recessed portion of a seat arm.

Throughout the specification and drawings, similar reference characters denote corresponding parts.

Referring to the accompanying drawings, the numeral 1 designates a preferably frusto-conical pedestal supported upon a base 2. In its top portion the pedestal contains two oppositely disposed peripheral slots 3, 3 through which a flat member 4 is adapted to be passed for a purpose to be hereinafter described, while in its bottom part the pedestal contains two oppositely-disposed peripheral slots 5, 5 for a purpose also to be described.

Surrounding the pedestal 1, and rotatable about it upon the base 2, is a frusto-conical sleeve 6 from the lower portion of which there project upwardly and outwardly curved arms 7 that are preferably cast integral with the sleeve. There are preferably four of these arms 7 projecting sidewise from said sleeve in pairs. Bolted to the upper middle portions of the arms 7 in the manner shown in Figs. 4 and 5, are the ear portions 8 of bracing arms 9 that project inwardly to an integral ring 10 that is firmly secured on the upper portion of the sleeve 6, by the flat member 4 that presses against a flat ring 11 integrally supported by said bracing arms 9. (See Figs. 3 and 6.) A pin 12 is passed downwardly through a hole in the top of the pedestal 1 and in the member 4, to prevent the latter from working out of the slots 3 after it is in place therein as shown in Fig. 6.

Referring to Figs. 6 and 11, there is provided on the outer end of each arm 7, a vertical lug 13. These lugs, of which there are four, are adapted to enter holes in the bottom corner portions of a seat cushion 14 whose top surface is preferably inclined from front to rear, thus saving material which would be necessary in a uniform dimension cushion for a seat of the turn-over type.

Secured to the outer ends of each pair of arms 7, is a slightly curved arm-supporting member 15 having upturned channel end portions 16 adapted to receive the base 17 of an arm-rest 18 that is elevated above the base by two inwardly-curved supporting standards 19, 19. (See Figs. 1, 2 and 6).

On the two rear arms 7, preferably opposite the lugs 13 thereon, are two outwardly-curved horizontal ear portions 20. Each ear portion 20 contains a longitudinal slot 21 adapted loosely to receive an outwardly curved toe 22 on a vertical lug 23 that projects downwardly from each corner of the lower vertical portion 24 of a cushion-back support 25 for the car-seat. The cushion-back support 25 is attached to the framework just described, by causing it to assume a horizontal position wherein the toes 22 on the lugs 23 may be forced downwardly through the slots 21, after which the support 25 is brought to a vertical position. The lugs 23 have sufficient freedom of movement within the slots 21 to permit the seat-back to be inclined by the occupant, against the tension of resilient means now to be described. the toes serving to prevent said back from working off the arms.

Secured within a cushion-back 26 that rests against the vertical portion 27 of the seat-back support 25, are swinging hooks 28 adapted to be received by eye-pieces 29 pivotally secured to the rear ends of slides 30 that have a horizontal movement in the recessed portions 31 provided in the lower sections of the arm rests 18. (See Figs. 12 and 14). Each arm rest 18 is divided horizontally to provide a lower section that contains a deep longitudinal recess 31, in the front portion of which is secured an anchor piece 32 having a flat base which is screwed in the bottom of the recess, and a vertical transverse block portion whose sides are firmly locked in cavities in the side walls of the recess. To the anchor piece 32 thus firmly secured in the recess 31 in each lower arm-rest section, one end of a coil spring 33 is attached, the other end of said spring being secured to the front end of the slide 30. The latter passes through a vertical grove in a guide 34 having an elongated flat base which is screwed in the bottom of the recess 31. The sides of the vertical grooved portion of said guide project into cavities in the side walls of said recess, as the sides of the vertical portion of the anchor piece 32 do, firmly to lock said guide in the recess. At its front end the slide 30 has a downwardly projecting portion 35 adapted to engage the guide 34 below the groove therein, to limit the outward movement of said slide when pressure is exerted against the seat-back by the occupant. The springs 33, however, will permit said seat-back to be inclined far enough for the occupant's comfort, returning it to a vertical position as soon as the occupant leaves the seat. The seat-backs, therefore, are not permanently inclined as in the turnover types of seats, thereby conserving space between the seats. The top section 35 of each arm-rest 18 snugly fits on top of the lower section, to which it is screwed after a flange 36 on the rear bottom portion of the top section enters the grooved guide 34 above the slide 30, and an angle piece 37 on the front bottom portion of said top section has been hooked over the anchor piece 32.

Referring to Figs. 6, 8 and 9, there is provided a foot rest 38 which is hingedly secured to the rear arms 7 by means of bracket pieces 39 that have right angled ends which enter holes in lugs 40 on said arms. These hinge connections permit the foot rest an inward or an outward movement, being normally held in its innermost position by a coil spring 41 secured to it and the base of the sleeve 6. (See Fig. 9).

Pivotally secured within a slot provided in the sleeve 6, is a dog 42 whose inner end is preferably pointed to engage in one of the slots 5 in the lower end of the pedestal 1 whereby the seat may be locked in either its extreme front or rear positions. The outer end of the dog 42 is secured to the foot-rest 38 whereby, by raising the latter against the tension of the spring 41, the inner end of the dog 42 may be withdrawn from a slot 5 to permit the sleeve 6 to be rotated about the pedestal 1 to a point where it may enter the opposite slot 5, firmly to hold the car seat in the reverse position. It will be observed from Fig. 9 that the inner periphery of the pedestal 1 bulges inwardly at its lower portion, to deepen the slots 5 for the purpose of enabling the inner end of the dog 42 to take a firmer grip in them. Secured to the middle portion of the foot rest 38 is an upwardly projecting rod 43 by means of which the foot rest may be raised by the hand to disengage the inner end of the dog 42 from a slot 5 in the pedestal 1 to permit the sleeve 6 to be rotated about the latter.

Any changes or modifications may be made in the construction or arrangement herein shown and described, within the scope of the subjoined claims.

Having described my invention, I claim:

1. In a device of the type described, the combination with a pedestal, of a sleeve surrounding said pedestal and rotatable around it, a car seat supported by said sleeve, and stationary horizontal means removably insertible in said pedestal above the sleeve, to prevent the latter from working above the pedestal.

2. In a device of the type described, the combination with a pedestal, of a sleeve surrounding said pedestal and rotatable therearound, a car seat supported by said sleeve, a horizontally-disposed ring surrounding the upper portion of the sleeve and tightly fitting against its outer periphery, and a member insertible through a pair of oppositely disposed slots in the upper portion of said pedestal, above said ring, to prevent the sleeve working above the pedestal.

3. In a device of the type described, the combination with a pedestal, of a base therefor, a sleeve surrounding said pedestal and rotatable around it, arms projecting outwardly and upwardly from said sleeve, two of said arms projecting from each side of said sleeve, a channel member secured to the outer ends of each pair of arms, and a side arm for the car seat, supported by each channel member.

4. In a device of the type described, the combination with a pedestal, a base therefor, a sleeve surrounding said pedestal and rotatable around it upon said base, arms projecting outwardly and upwardly from said sleeve, a cushion supported by the outer ends of said arms, and a seat-back hingedly secured to the outer ends of the rear arms.

5. In a device of the type described, the combination with a pedestal, of a sleeve surrounding said pedestal and rotatable around it, arms projecting outwardly and upwardly from said sleeve, a back for the seat, hingedly secured to the outer ends of the rear supporting arms, side arms for the seat, secured to the outer ends of said supporting arms, and resilient means within said side arms, normally adapted to hold the back for the seat in an upright position, and to permit said back to be inclined by the occupant of the seat against the pressure of said resilient means.

6. In a device of the type described, the combination with a pedestal, of a sleeve surrounding said pedestal and rotatable around it, arms projecting outwardly and upwardly from said sleeve, a back for the seat, hingedly secured to the outer ends of the rear supporting arms, side arms for the seat secured to the outer ends of said supporting arms, a spring positioned in a recessed portion of each side arm, an outwardly projecting slide secured to said spring, and means removably securing the outer end of said slide to the back of said seat, normally to hold said back in an upright position, and to permit it to be inclined by the occupant against the pressure of said springs.

7. In a device of the type described, the combination with a pedestal, of a sleeve surrounding said pedestal and rotatable around it, arms projecting outwardly and upwardly from said sleeve, a back for the seat, hingedly secured to the outer ends of the rear arms, side arms for the seat secured to the outer ends of the supporting arms, each side arm containing a longitudinal recess in its top portion, a spring in each recess, an anchor piece for said spring in the front portion of each recess, a grooved member secured in the rear portion of each recess, a slide secured to said spring, movable in each grooved member, an eye piece pivotally secured to the outer end of each slide, and a hook pivotally secured to the back for the seat, adapted to enter each eye piece, for the purpose specified.

8. In a device of the type described, the combination with a pedestal, of a sleeve surrounding said pedestal and rotatable around it, arms projecting outwardly and upwardly from said sleeve, a back for the seat, hingedly secured to the outer ends of the rear supporting arms, side arms for the seat secured to the outer ends of the supporting arms, each side arm containing a longitudinal recess in its top portion, a spring in each recess, a grooved member secured in the rear portion of each recess, a slide secured to said spring, movable in each grooved member, means removably securing the outer end of said slide to the back for said seat, and a shoulder formed on the front end of each slide, adapted to engage the grooved member, to limit the outward movement of the slide, and through it, the rearward movement of the back for the seat.

9. In a device of the type described, the combination with a pedestal, of a sleeve surrounding said pedestal and rotatable around it, arms projecting outwardly and upwardly from said sleeve, a back for the seat, hingedly secured to the outer ends of the rear supporting arms, side arms for the seat secured to the outer ends of the supporting arms, each side arm containing a longitudinal recess in its top portion, a pair of oppositely disposed grooves formed in the front and rear portions of each recess, an anchor piece secured in the front portion of each recess, a raised transverse portion on said anchor piece projecting into the front grooves, a grooved member secured in the rear portion of said recess, the side walls of said channel member projecting into the rear grooves, a spring in each recess, secured at its front end to its respective anchor piece, a slide secured to the rear end of said spring, movable through each grooved member, and means for removably securing each slide to the back for the seat, for the purpose specified.

10. In a device of the type described, the combination with a pedestal, of a sleeve surrounding said pedestal and rotatable around it, arms projecting outwardly and upwardly from said sleeve, outwardly projecting horizontal ears on the outer ends of said arms, a back for the seat, and downwardly projecting hook-shaped pieces on said back adapted to enter slots in said ears, hingedly to secure said back to the outwardly projecting arms.

In testimony whereof I have hereunto set my hand this 27th day of September, 1919.

FRANK SMOLAR.

Witness:
   HOWARD S. SMITH.